No. 675,194.  
J. M. CLARK.  
DIVIDER FOR MOWING OR REAPING MACHINES.  
(Application filed Oct. 18, 1900.)

Patented May 28, 1901.

(No Model.)

WITNESSES:  
Edward Thorpe  
C. R. Ferguson

INVENTOR  
John M. Clark  
BY  
Munn  
ATTORNEYS

UNITED STATES PATENT OFFICE.

JOHN M. CLARK, OF RATHBONE, MISSOURI.

DIVIDER FOR MOWING OR REAPING MACHINES.

SPECIFICATION forming part of Letters Patent No. 675,194, dated May 28, 1901.

Application filed October 18, 1900. Serial No. 33,483. (No model.)

*To all whom it may concern:*

Be it known that I, JOHN M. CLARK, a citizen of the United States, and a resident of Rathbone, in the county of Phelps and State of Missouri, have invented a new and Improved Divider for Mowing or Reaping Machines, of which the following is a full, clear, and exact description.

This invention relates to improvements in devices for dividing the grass or grain at the end of the cutter-bar; and the object is to provide a simple device for effectually dividing either short or long standing or fallen and tangled grass or grain without manually adjusting the device for varying heights.

I will describe a divider for mowing or reaping machines embodying my invention and then point out the novel features in the appended claim.

Reference is to be had to the accompanying drawings, forming a part of this specification, in which similar characters of reference indicate corresponding parts in all the figures.

Figure 1:
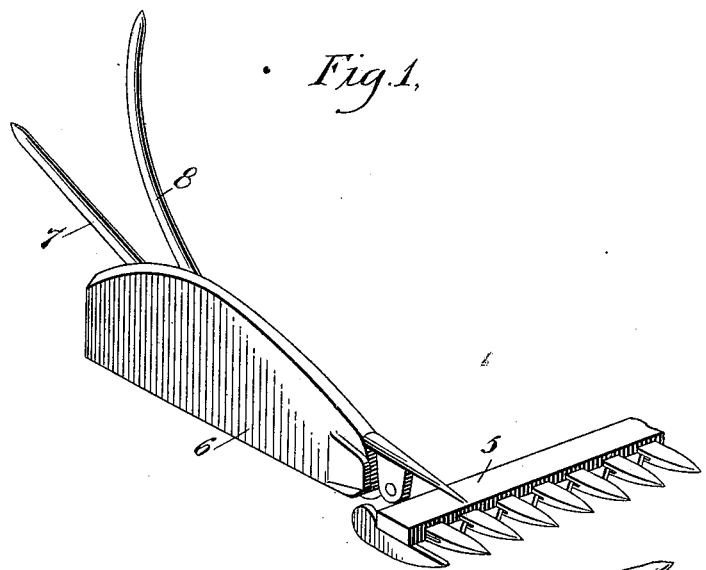
Figure 2:
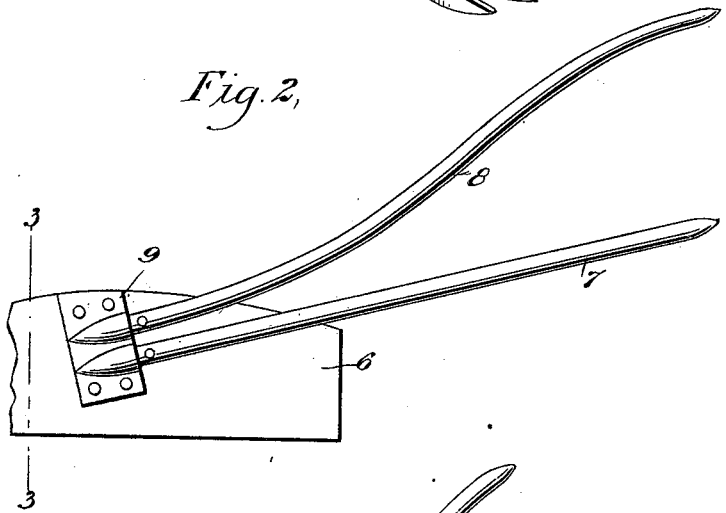
Figure 3:
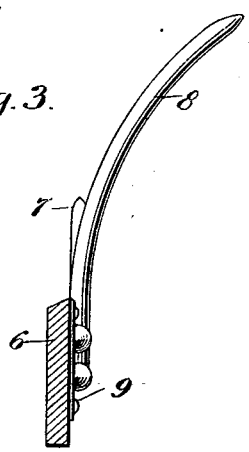

Figure 1 is a perspective view of a divider embodying my invention. Fig. 2 is an inside elevation thereof, and Fig. 3 is a section on the line 3 3 of Fig. 2.

Referring to the drawings, 5 designates the machine finger-bar, to which the divider-board 6 is attached in the usual manner. Extended rearward and at an upward incline from the inner side of the divider-board is a divider-arm 7, and arranged above this divider-arm 7 is a supplemental divider-arm 8. This supplemental divider-arm is longitudinally curved inward and extends at an upward angle relatively to the arm 7, thus having a gradually-increasing height to engage with different heights of grass or grain. The two divider-arms have their ends inserted in sockets formed in a plate 9, attached to the board 6.

Having thus described my invention, I claim as new and desire to secure by Letters Patent—

The combination with a divider-board of a mowing-machine, and an upwardly and rearwardly inclined straight divider-arm secured to said board, of an auxiliary divider-arm secured to the board above the first-named arm, the said auxiliary arm being curved longitudinally upwardly and inwardly relatively to the said first-named arm, substantially as and for the purpose set forth.

In testimony whereof I have signed my name to this specification in the presence of two subscribing witnesses.

JOHN M. CLARK.

Witnesses:
  FRANK SCHNEIDER,
  G. H. COX.